# 2,766,266

SUBSTITUTED 1,5-PENTANEDIOL ESTERS

William S. Emerson and Raymond I. Longley, Jr., Dayton, Ohio, assignors to Monsanto Chemical Company, St. Louis, Mo., a corporation of Delaware No Drawing. Application March 27, 1950,
Serial No. 152,274

1 Claim. (Cl. 260—410.6)

This invention relates to new compounds prepared by the esterification of substituted 1,5-pentanediols with monocarboxylic aliphatic and aromatic acids.

Esterification reactions are well-known, as for example the preparation of simple monoesters such as ethyl acetate, simple diesters such as dibutyl phthalate, and complex polyesters such as alkyd resins. The vast number of theoretically possible interaction products of mono- and polyfunctional alcohols and mono- and polyfunctional carboxylic acids has not been fully investigated in spite of the relative simplicity of esterification reactions. This is readily understood when the Herculean task of systematically preparing and evaluating these products is considered. Hence, large areas in this field of chemistry are unexplored.

It has now been found that the interaction products of substituted 1,5-pentanediols, as for example, 2-methyl-1,5-pentanediol, 2-ethyl-1,5-pentanediol and 3-methyl-1,5-pentanediol; with aliphatic monocarboxylic acids containing from 8 to 12 carbon atoms, as for example, caprylic, pelargonic, capric, undecylic, lauric, 2-ethylhexoic and other homologous acids; aromatic monocarboxylic acids containing from 7 to 10 carbon atoms, as for example, benzoic, toluic, dimethylbenzoic, ethylbenzoic, phenylacetic, β-phenylpropionic and other homologous acids; and mixtures thereof provide novel compounds which were found to impart unexpectedly superior properties when employed as plasticizers for polyvinyl chloride resins. These compounds have the general formula

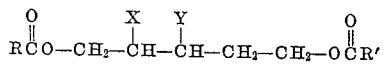

wherein R and R' are selected from the group consisting of alkyl radicals containing from 7 to 11 carbon atoms, inclusive, and aromatic radicals containing from 6 to 9 carbon atoms, inclusive; X is selected from the group H, CH₃ and C₂H₅; Y is selected from the group H and CH₃; and at least one of the group X and Y is an alkyl radical. This invention therefore relates to dialkyl, diaryl, diaralkyl, and mixed diesters, selected from the group consisting of alkyl, aryl, and aralkyl radicals with the limits above stated of substituted 1,5-pentanediol.

The following examples are illustrative of this invention:

Example 1

130 g. (1.06 mole) benzoic acid
59 g. (0.5 mole) 3-methyl-1,5-pentanediol
45 ml. benzene The above materials were placed in a 1000 ml. flask equipped with a reflux condenser through a Dean and Stark distilling receiver and heated at reflux for 17 hours. The reaction mixture was cooled, diluted with hexane and 70 g. of caustic solution containing 10 g. sodium hydroxide was added thereto with stirring to neutralize any residual benzoic acid. Then the two liquid phases were allowed to separate and the aquous phase removed. After additional water washing of the reaction mixture it was fractionally distilled and 137 g. of product recovered at 174° C. and 0.1 mm. of mercury. The yield was 94.5 percent of 3-methyl-1,5-pentanediol dibenzoate.

Calculated for C₂₀H₂₂O₄: C, 73.6; H, 6.7. Found: C, 73.9; H, 6.7.

Example 2

122 g. (1 mole) benzoic acid
172 g. (1 mole) capric acid
118 g. (1 mole) 3-methyl-1,5-pentanediol
50 ml. benzene The above materials were reacted and treated in a similar manner to Example 1 and 334 g. (89 percent yield) of 3-methyl-1,5-pentanediol benzoate-caprate mixture boiling betwen 178 and 192° C. at about 0.25 mm. mercury was obtained.

Example 3

70 g. (0.51 mole) toluic acid
90 g. (0.52 mole) capric acid
59 g. (0.5 mole) 3-methyl-1,5-pentanediol
45 ml. benzene The above materials were reacted at reflux for 5 hours and treated in a similar manner to Example 1 and 138 g. (71 percent yield) of 3-methyl-1,5-pentanediol toluate-caprate mixture boiling between 184 and 192° C. at 0.2 mm. mercury was obtained.

Other compounds which may be prepared in a similar manner are, for example:

3-methyl-1,5-pentanediol benzoate-laurate
3-methyl-1,5-pentanediol benzoate-2-ethylhexoate
3-methyl-1,5-pentanediol benzoate-caprylate
3-methyl-1,5-pentanediol toluate-laurate
3-methyl-1,5-pentanediol toluate-2-ethylhexoate
3-methyl-1,5-pentanediol ditoluate
3-methyl-1,5-pentanediol toluate-benzoate
3-methyl-1,5-pentanediol dimethylbenzoate-caprylate
3-methyl-1,5-pentanediol ethylbenzoate-pelargonate
3-methyl-1,5-pentanediol phenylacetate-2-ethylhexoate
2-methyl-1,5-pentanediol toluate-caprylate
2-ethyl-1,5-pentanediol benzoate-laurate It is not essential that the mixed esters be produced from equimolecular quantities of aliphatic and aromatic monocarboxylic acids, but various ratios can be employed, as for example 0 to 100 mole percent aromatic monocarboxylic acid and 100 to 0 mole percent aliphatic monocarboxylic acid, such that the diester product is the esterification product of one mole of a substituted 1,5-pentanediol with the sum of about 2 moles of the aforementioned monocarboxylic acids.

In general the availability of CP aliphatic acids and isomeric aromatic acids is limited and expensive. Thus, where a specific acid is mentioned in this specification, it is understood that the commercially available acids, consisting predominately of the specific acid named, is intended.

Esterification catalysts, such as p-toluenesulfonic acid, sulfuric acid, etc. can be employed to accelerate the reaction. Also other inert solvents, as for example toluene and xylene can be substituted for the benzene to aid in continuously removing the water formed during esterification.

The plasticized vinyl chloride resin compositions utilizing the compounds of this invention are described and claimed in the copending application of William S. Emerson and Raymond I. Longley, Jr., Serial No. 152,258, filed March 27, 1950, now U. S. Patent No. 2,700,656.

We claim:
The compound 3-methyl-1,5-pentanediol benzoate-caprate.

References Cited in the file of this patent

UNITED STATES PATENTS

| | | |
|---|---|---|
| 2,497,968 | Young | Feb. 21, 1950 |
| 2,504,929 | Hetzel | Apr. 18, 1950 |
| 2,533,250 | Hetzel | Dec. 12, 1950 |

FOREIGN PATENTS

| | | |
|---|---|---|
| 468,533 | Great Britain | July 7, 1937 |